United States Patent
Jain et al.

(10) Patent No.: US 11,948,164 B2
(45) Date of Patent: Apr. 2, 2024

(54) AUTOMATICALLY MEASURING QUALITY SCORES FOR CONNECTED COMPONENTS USING MACHINE LEARNING MODELS

(71) Applicant: Walmart Apollo, LLC, Bentonville, AR (US)

(72) Inventors: Mridul Jain, Cupertino, CA (US); Saigopal Thota, Fremont, CA (US); Ashraful Arefeen, Riverside, CA (US); Antriksh Akshesh Shah, Gandhinagar (IN); Albin Kuruvilla, Bengaluru (IN); Gajendra Alias Nishad Kamat, Los Altos, CA (US); Rijul Magu, Raleigh, NC (US); Neil Mohan Reddy Palleti, Cupertino, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/525,758

(22) Filed: Nov. 12, 2021

(65) Prior Publication Data
US 2023/0153848 A1    May 18, 2023

(51) Int. Cl.
G06Q 30/02       (2023.01)
G06Q 30/0204    (2023.01)
G06Q 30/0241    (2023.01)
G06Q 30/0242    (2023.01)

(52) U.S. Cl.
CPC ..... *G06Q 30/0204* (2013.01); *G06Q 30/0244* (2013.01); *G06Q 30/0276* (2013.01)

(58) Field of Classification Search
CPC .......... G06Q 30/0204; G06Q 30/0244; G06Q 30/0276
See application file for complete search history.

(56) References Cited

U.S. PATENT DOCUMENTS

| | | | |
|---|---|---|---|
| 8,255,386 B1 * | 8/2012 | Annau | G06F 16/22 707/711 |
| 8,949,158 B2 | 2/2015 | Borthwick et al. | |
| 9,311,351 B2 * | 4/2016 | Maran | G06F 16/24 |
| 10,085,073 B2 | 9/2018 | Ray et al. | |
| 10,235,633 B2 * | 3/2019 | Tereshkov | G06F 16/9024 |
| 11,036,886 B2 * | 6/2021 | Gkoulalas-Divanis | G06F 21/6254 |

(Continued)

OTHER PUBLICATIONS

Approaches to Machine Learning, P. Langley at Carnegie-Mellon University (1984) (Year: 1984).*

(Continued)

*Primary Examiner* — Breffni Baggot
(74) *Attorney, Agent, or Firm* — BRYAN CAVE LEIGHTON PAISNER LLP

(57) ABSTRACT

A system including one or more processors and one or more non-transitory computer-readable media storing computing instructions configured to run on the one or more processors and perform: generating linkage scores between nodes at least based on a machine learning model; creating links between the nodes to form connected components based on the linkage scores exceeding a predetermined threshold; generating an actual matching linkage set of the nodes linked in the connected components by using a relaxed blocking criteria; and generating a quality score for the connected components. Other embodiments are disclosed.

20 Claims, 6 Drawing Sheets

(56) References Cited

U.S. PATENT DOCUMENTS

| | | | |
|---|---|---|---|
| 11,514,054 B1* | 11/2022 | Borthwick | G06N 20/00 |
| 2016/0004724 A1* | 1/2016 | Har-Noy | G06F 16/23 |
| | | | 709/219 |
| 2020/0050966 A1 | 2/2020 | Enuka et al. | |
| 2020/0250161 A1* | 8/2020 | Jain | G06Q 30/02 |
| 2020/0250478 A1* | 8/2020 | Jain | G06N 20/10 |

OTHER PUBLICATIONS

"Record Linkage" Halbert Dunn American Journal of Public Health vol. 36 p. 1412-1416 (Year: 1946).*

Fellegi "A Theory for Record Linkage" J of Am Statistical Assoc vol. 64 No. 328 pp. 1183-1210 (Year: 1969).*

Mridul Jain, Building Identity Graphs Over Heterogeneous Data (year: 2020)) https://www.databricks.com/session_na20/building-identity-graphs-over-heterogeneous-data (Year: 2020).* https://en.wikipedia.org/wiki/F-score (Year: 2020).*

A Look at Precision, Recall, and F1-Score | by Teemu Kanstrén | Towards Data Science https://towardsdatascience.com/a-look-at-precision-recall-and-f1-score-36b5fd0dd3ec (Year: 2020).*

Learning Blocking Schemes for Record Linkage (Year: 2006).*

University of Chicago "Record Linkage" (Year: 2021).*

Wunnava, R., et al., "Building a Customer Identity Graph With Amazon Neptune," from https://aws.amazon.com/blogs/database/building-a-customer-identity-graph-with-amazon-neptune/, 14 pages May 12, 2020.

Samanta, S., et al., "Creating High-Quality Machine Learning Models for Financial Services Using Amazon SageMaker Autopilot," https://aws.amazon.com/blogs/machine-learning/creating-high-quality-machine-learning-models-for-financial-services-using-amazon-sagemarker-autopilot/, 9 pages Jan. 13, 2021.

* cited by examiner

AUTOMATICALLY MEASURING QUALITY SCORES FOR CONNECTED COMPONENTS USING MACHINE LEARNING MODELS

TECHNICAL FIELD

This disclosure relates generally to automatically measuring quality scores for connected components using machine learning models.

BACKGROUND

Various concepts can be represented by one or more connected components that include nodes and links (edges) between the nodes. For example, the nodes can represent various types of identifiers, and the links can represent relationships between the identifiers. Various different connected components can be formed, some of which can provide a better representation than others.

BRIEF DESCRIPTION OF THE DRAWINGS

To facilitate further description of the embodiments, the following drawings are provided in which.

Figure 1:
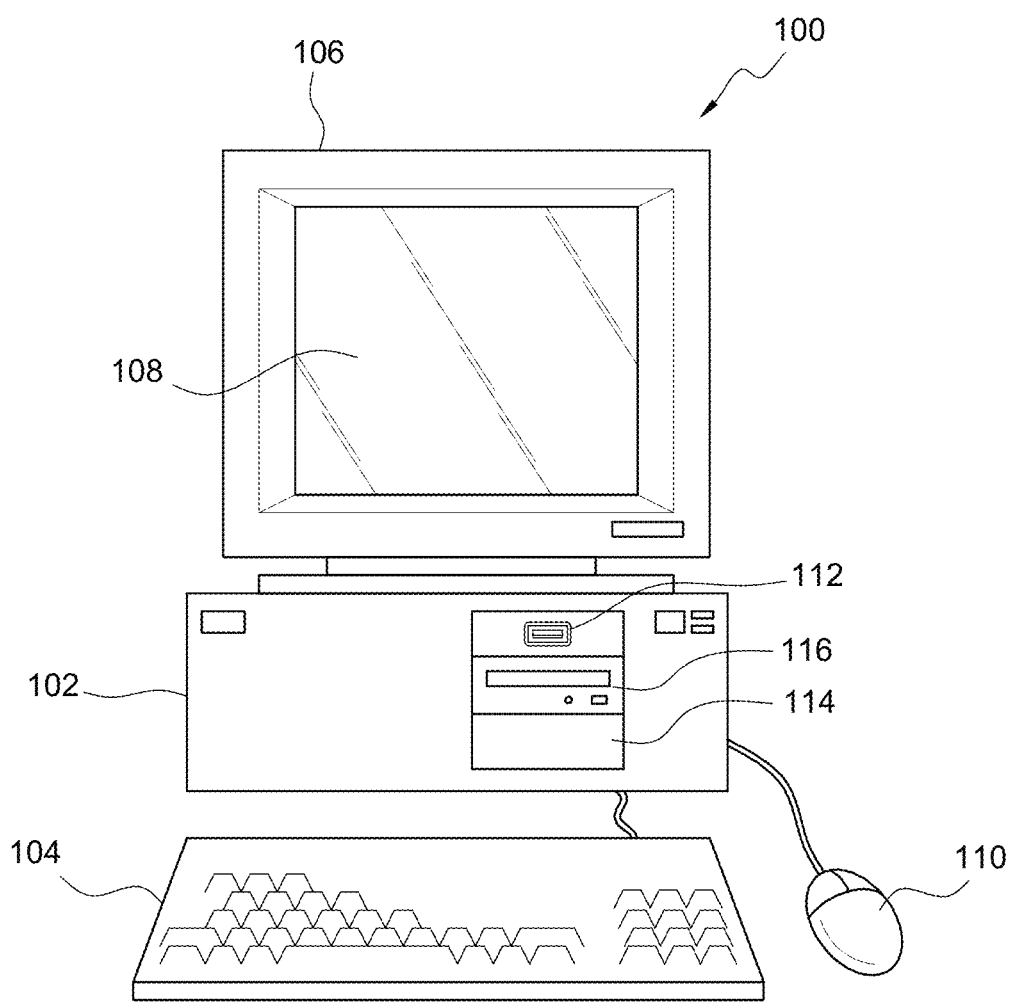
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
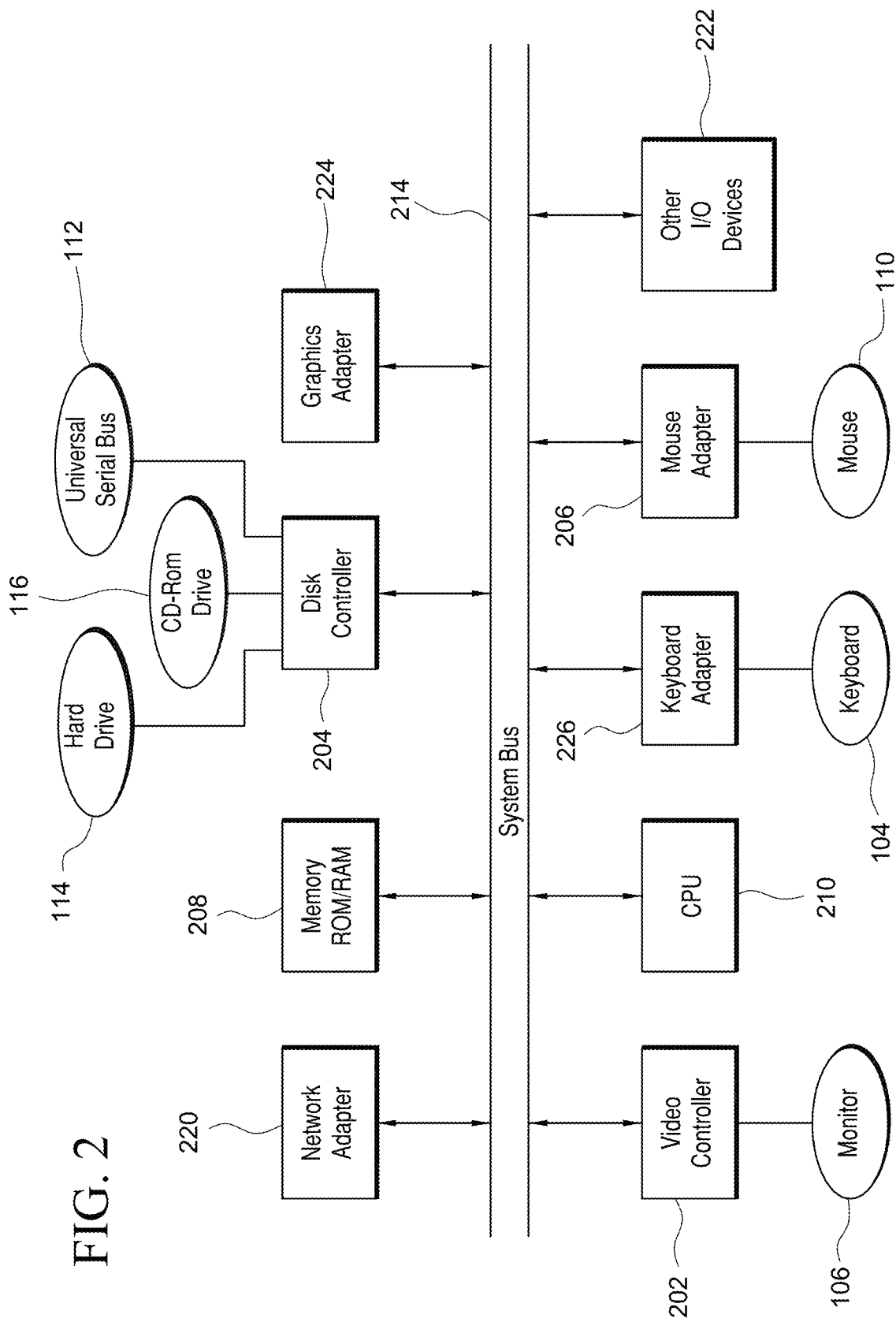
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
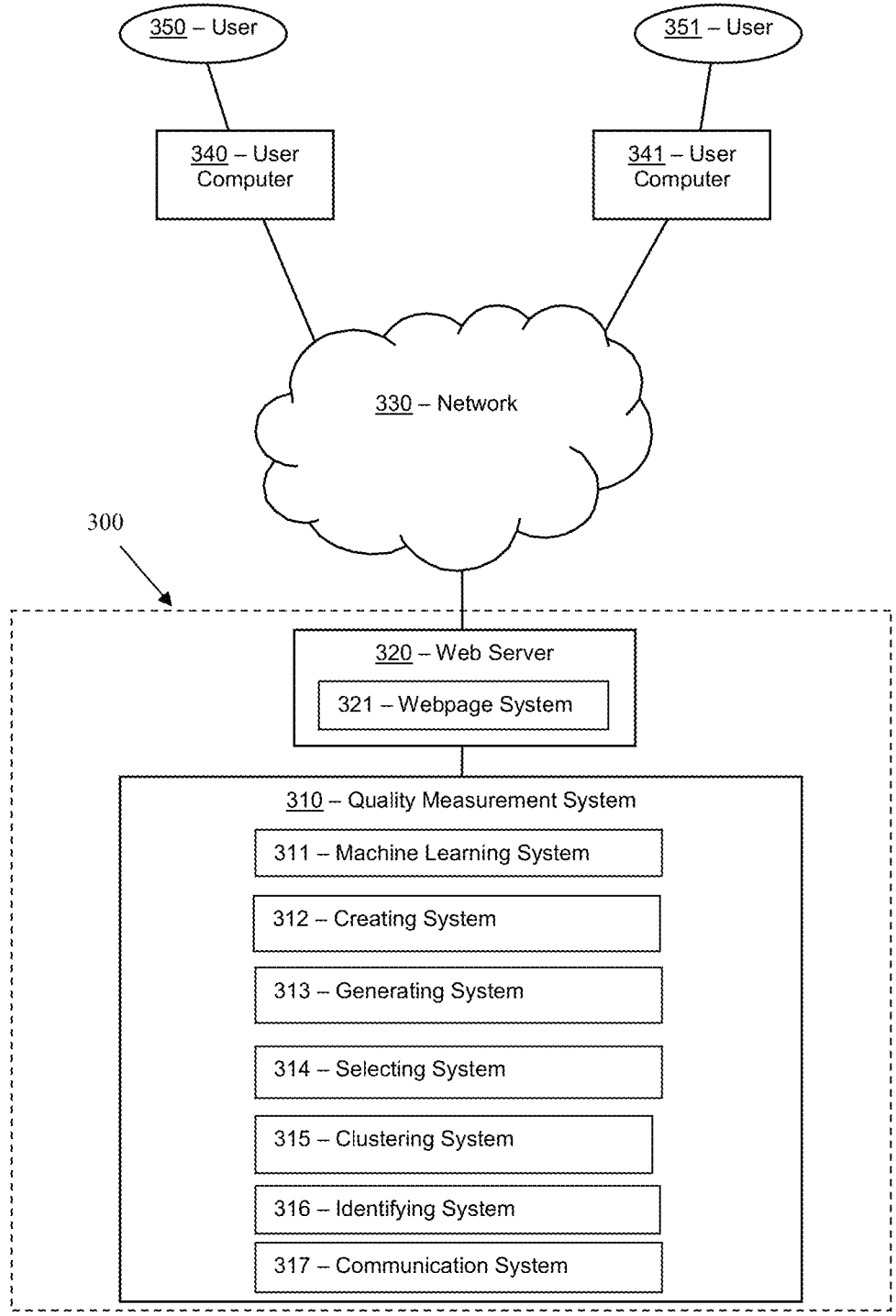
FIG. 3 illustrates a block diagram of a system that can be employed for automatically generating quality scores for connected components using machine learning models, according to an embodiment.

Turning ahead in the drawings, FIG. 3 illustrates a block diagram of a system 300 that can be employed for automatically generating quality scores for connected components using machine learning models, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a quality measurement system 310 and/or a web server 320. Quality measurement system 310 and/or web server 320 can be a computer system, such as computer system 100 (FIG. 1), as described above, and can each be a single computer, a single server, or a cluster or collection of computers or servers, or a cloud of computers or servers. In another embodiment, a single computer system can host two or more of, or all of, quality measurement system 310 and/or web server 320. Additional details regarding quality measurement system 310 and/or web server 320 are described herein.

In a number of embodiments, quality measurement system 310 can be a special-purpose computer programed specifically to perform specific functions not associated with a general-purpose computer, as described in greater detail below.

In some embodiments, web server 320 can be in data communication through network 330 with one or more user computers, such as user computers 340 and/or 341. Network 330 can be a public network, a private network or a hybrid network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In some embodiments, an internal network that is not open to the public can be used for communications between quality measurement system 310 and/or web server 320 within system 300. Accordingly, in some embodiments, quality measurement system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

In several embodiments, system 300 can include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 300 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 300. In a similar manner, the processors and/or the non-transitory computer-readable media can be local and/or remote to each other.

Meanwhile, in many embodiments, system 300 also can be configured to communicate with and/or include one or more databases. The one or more databases can include a product database that contains information about products, items, or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between system 300, network 330, user computers 340-341, uses 350-351, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Figure 4:
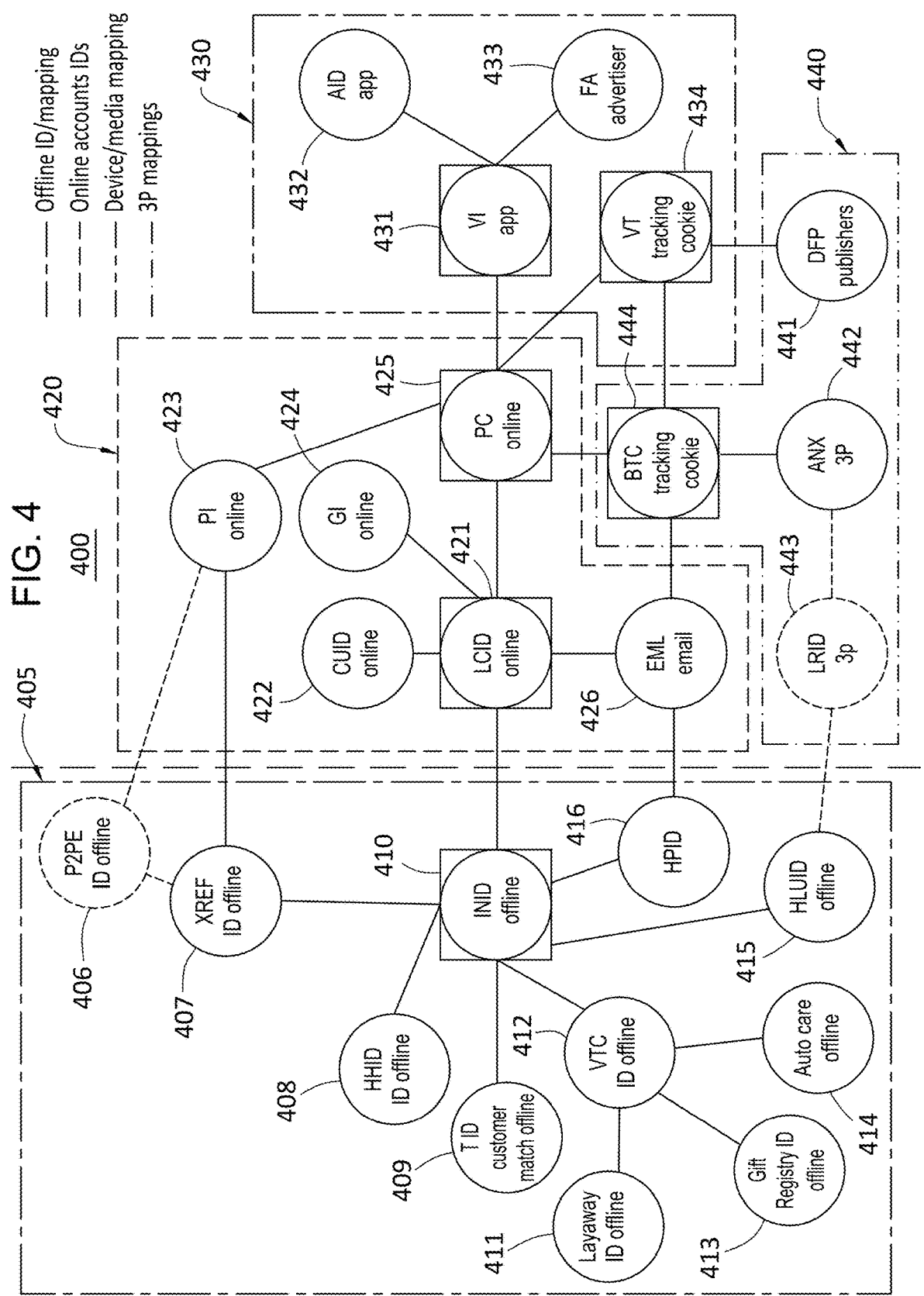
FIG. 4. illustrates exemplary connected components with clusters.

Turning ahead in the drawings, FIG. 4 illustrates exemplary connected components 400 with clusters. Connected components 400 can be used to determine a utility (e.g., quality) of the data expressed in each connected component. Connected components 400 also can illustrate an accurate graphical representation at a point in time (e.g., a snapshot) of one or more users associated with one or more user identifiers and/or one or more event identifiers. Connected components 400 are merely exemplary.

In a number of embodiments, measuring a utility of connected components 400 can be expressed in multiple ways by factoring in the multiple categories of use cases. In some embodiments, a graph connected component (e.g., 400) can be divided into one or more subsets by major categories of use cases, for example targeting, personalization, audience building and customer segments, analytics, privacy, and/or another suitable category of use cases. In various embodiments, multiple uses cases can be mapped together based on metrics associated with event identifiers and/or user identifiers linked to each other on a particular size of a graph. For example: offline accounts to online accounts, online accounts to device and/or media, user account identifiers to 3P identifiers, and/or another suitable categories of use cases.

Based on the type of categories of use cases, in various embodiments, connected components 400 can be divided into 4 exemplary major clusters: cluster 405 (offline identifiers mappings), cluster 420 (online account identifiers), cluster 430 (device and/or media mappings), and cluster 440 (3P identifiers mappings). In some embodiments, cluster 405 can include multiple offline identifiers linked to each other based on one or more offline parameters that can also be associated with user identifiers and/or event identifiers, such as offline nodes 406, 407, 408, 409, 410, 411, 412, 413, 414, 415, and/or 416. Examples of offline activities associated with offline nodes can include in-store transaction, consumer attribute identifiers, and/or other suitable offline activities.

Similarly, in a number of embodiments, cluster 420 can include multiple online account identifiers linked to each other based on one or more online account identifier parameters that can also be associated with user identifiers and/or event identifiers, such as online nodes 421, 422, 423, 424, 425, and/or 426. Examples of online nodes can include online user accounts, email addresses, and/or other suitable online account identifiers.

In several embodiments, cluster 430 can include multiple device and/or media mappings linked to each other based on one or more device and/or media mappings parameters that can also be associated with user identifiers and/or event identifiers, such as device and/or media mappings nodes 431, 432, 433, and/or 434. Examples of device and/or media mappings nodes can include software application identifiers, tracking identifiers, cookies, and/or other suitable multiple device and/or media mappings.

In various embodiments, cluster 440 can include multiple 3P (e.g, third-party) identifier mappings linked to each other based on one or more 3P parameters that can also be associated with user identifiers and/or event identifiers, such as 3P nodes 441, 442, 443, and/or 444. Examples of 3P nodes can include subsidiary channel user identifiers, subsidiary channel cookies, and/or other suitable 3P nodes.

In some embodiments, connected components 400 can be used to identify a quality path via matching particular nodes from each major cluster to another. In several embodiments, each particular node from each major category can be selected based on one or more rules to form the quality path across each major category. For example, node 410 (cluster 405) can be linked to node 421 (cluster 420). In following with the example, node 421 (cluster 420) can be linked to node 425 (cluster 420) to node 431 (cluster 430) and also node 444 (cluster 440) to form the quality path across the major clusters.

Figure 5:
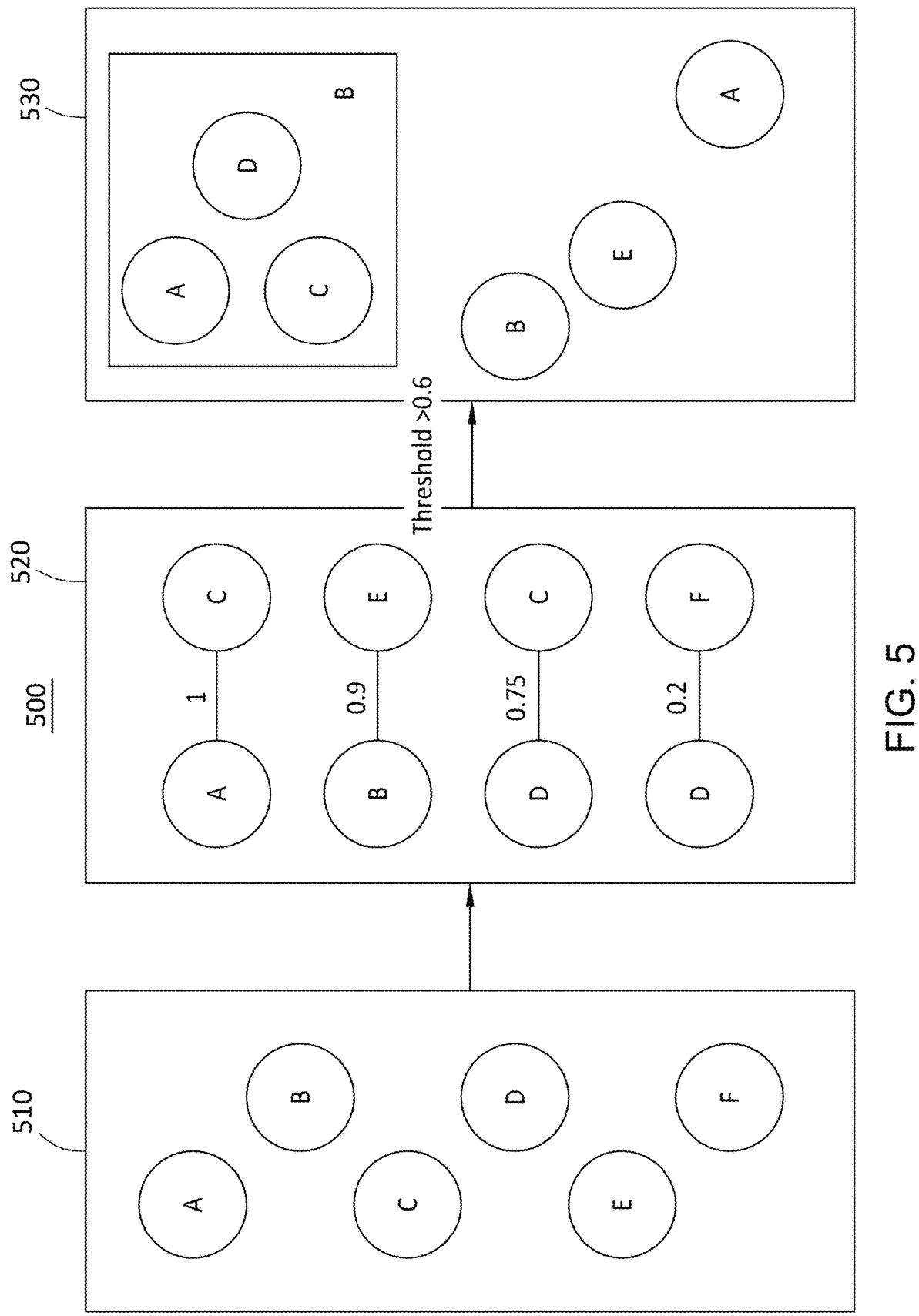
FIG. 5 illustrates a flow chart for linking nodes that form the connected components, according to an embodiment.

Turning ahead in the drawings, FIG. 5 illustrates a flow chart for linking nodes that form the connected components, according to an embodiment. Method 500 can include linking graph connected components based on a predetermined threshold. Method 500 can be employed in many different embodiments and/or examples not specifically depicted or described herein. In some embodiments, the procedures, the processes, and/or the activities of method 500 can be performed in the order presented or in parallel. In other embodiments, the procedures, the processes, and/or the activities of method 500 can be performed in any suitable order. In still other embodiments, one or more of the procedures, the processes, and/or the activities of method 500 can be combined or skipped. In several embodiments, system 300 (FIG. 3) can be suitable to perform method 500 and/or one or more of the activities of method 500.

In these or other embodiments, one or more of the activities of method 500 can be implemented as one or more computing instructions configured to run at one or more processors and configured to be stored at one or more non-transitory computer-readable media. Such non-transitory computer-readable media can be part of a computer system such as lifecycle management engine 310 and/or web server 320. The processor(s) can be similar or identical to the processor(s) described above with respect to computer system 100 (FIG. 1).

In several embodiments, method 500 can include a block 510 of identifying multiple components and/or nodes mapped to an event identifier and/or a user identifier. In many embodiments, block 510 can use a set of nodes selected based on tracking data over multiple events and/or multiple user identifiers. Such an exemplary set of nodes can include a nodes A thru F. In various embodiments, each node can be tracked over on a specific time period and/or an independent activity. In some embodiments, each node (e.g., component) can represent an event metric based on an event identifier that can include a use case, a transaction, a visit to a webpage, browser activity, and/or another suitable type of event. In many embodiments, a user identifier can include a traceable entity identifier ("tid"), a traceable entity graph identifier ("tgid"), a method of payment identifier, a user identification associated with an account, and/or another suitable type of identifier. Block 510 can involve receiving requests from users for remodels and/or special projects during a time period in advance of a start date, such a time period can be 12 months, 13 months, and/or another suitable time period.

In several embodiments, method 500 can proceed after block 510 to a block 520. In some embodiments, method 500 can include block 520 of determining a linkage score for each pair of nodes of a set of nodes based upon a distance between each node. In various embodiments, block 520 can include calculating a distance between each node using a machine learning classification model, such as a neural network and/or a deep learning classification algorithm, based a degree of whether each node is related to and/or linked to a user identifier and/or an event identifier. In some embodiments, the entity matching algorithm can calculate a score representing similarities between two data points, such similarities can be based on attributes, metadata, and/or another suitable type of data point. In various embodiments, training data for the machine learning classification model can include attributes of two identifiers as input data and generate a score between 0 (no match) and 1 (exact match) that can represent the degree of similarity between two identifiers as output. In several embodiments, block 520 can include determining whether a pair of nodes exceeds a predetermined linkage threshold that can indicate criteria for: (i) linking the pair of nodes, (ii) a distance of each linkage between the pair of nodes, where a shorter distance over a longer distance of each link can indicate a probability that the pair of nodes are related by an event and/or a user identifier and/or another suitable metric, and/or (iii) grouping the pair of nodes into a larger connected component group based on a cluster of components on a graph.

In various embodiments, method 500 can proceed after block 520 to a block 530. In many embodiments, method 500 can include block 530 of grouping connected components using a predetermined linkage threshold 540. In several embodiments, calculating a particular predetermined linkage threshold 540 can be based on one or more rules and/or a domain history. For example, predetermined linkage threshold 540 can be >0.6, wherein a linkage score between node A and node C can be 1.0 which exceeds predetermined linkage threshold 540, thus node A and node C can be linked by a distance equivalent to 1.0 on graph or a group of connected components. Similarly, a linkage score of 0.9 which is greater than 0.6 between node B and node E can indicate the pair of nodes can be linked by a distance of 0.9 and a linkage score of 0.75 between node D and C which is also greater than 0.6 also can be linked by a distance of 0.75 on a graph. However a linkage score of 0.2 between node D and node F falls below the predetermined linkage threshold 540 of greater than 0.6, thus not indicating a match between the pair of nodes, thus no link can be recommended based on predetermined linkage threshold 540. In several embodiments, each node of a set to nodes can be mapped to one or more groups or clusters of nodes based on multiple criteria. For example, a cluster can include node A, node B, node C, and node D based on a common parameter such as a common event and/or a common identifier. Similarly, another cluster can include node B and node E, and yet another cluster can include a single node F.

Figure 6:
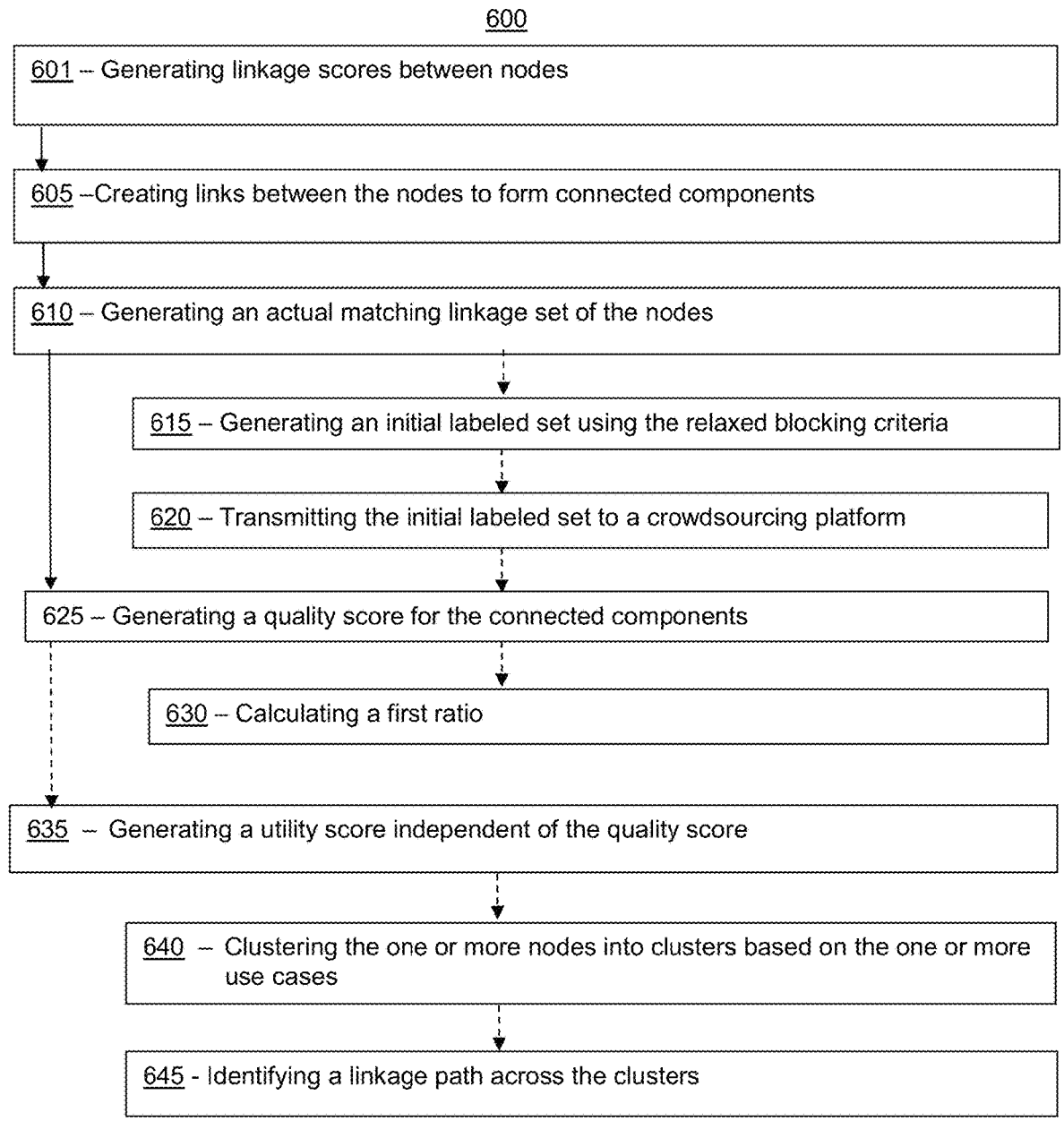
FIG. 6 illustrates a flow chart for a method of automatically generating quality scores for connected components using machine learning models, according to another embodiment.

Turning ahead in the drawings, FIG. 6 illustrates a flow chart for automatically generating quality scores for connected components using machine learning models, according to another embodiment. Method 600 is merely exemplary and is not limited to the embodiments presented herein. Method 600 can be employed in many different embodiments and/or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped. In several embodiments, system 300 (FIG. 3) can be suitable to perform one or more of the activities of method 600.

In these or other embodiments, one or more of the activities of method 600 can be implemented as one or more computing instructions configured to run at one or more processors and configured to be stored at one or more non-transitory computer-readable media. Such non-transitory computer-readable media can be part of a computer system such as quality measurement system 310 and/or web server 320. The processor(s) can be similar or identical to the processor(s) described above with respect to computer system 100 (FIG. 1).

In various embodiments, method 600 can involve quantifying a quality score for connected components, as describe in greater detail below. In many embodiments, quantifying the quality score can be used as an objective metric that measures the quality (e.g., confidence) of tracking different events and/or touchpoints of each user that can be linked to an identity associated with a connected component and/or portions of each connected components. For example, measuring the quality of connected components can be advantageous by identifying a true graph of each user and/or customer from the customer data stored in a database.

Referring to FIG. 6, method 600 can include a block 601 of generating linkage scores between nodes at least based on a machine learning model, such as a deep neural network, a decision tree, a support-vector model, and/or another suitable machine learning model. In many embodiments, training data for a machine learning model can include historical records of multiple types of nodes during a period of time and output for the machine learning models can include a linkage score based on a degree of whether each node of the nodes can be matched and/or linked by a common factor. Block 601 can be similar or identical to the activities described in blocks 520 and 530 (FIG. 5). In several embodiments, block 601 can be implemented as described in connection with FIGS. 4 and 5.

In various embodiments, improving a quality score for every linkage of two or more nodes in the connected components can be based on (i) using a single definition of a utility score and (ii) parameterizing the definition across 4-5 broad categories of use cases in the connected components, which can accommodate domain bias as well as extensibility (for newer categories of use cases). For example, in some cases, it may not be possible to have a single utility score for all use cases, as use cases differ from one another.

In several embodiments, block 601 of generating the linkage scores can include at least one of profile matching or co-occurrence matching. In some embodiments, profile matching can include generating similarity scores for pairs of nodes based on multiple attributes, identifiers, and/or another suitable profile metric. In various embodiments, co-occurrence matching can include matching nodes with traceable entities. Such a traceable entity can include an email account, a method of payment, and/or another suitable traceable entity.

In various embodiments, each of the nodes can include (i) a respective type of identifier of multiple identifiers and (ii) a respective traceable entity identifier.

In some embodiments, method 600 also can include a block 605 of creating links between the nodes to form connected components based on the linkage scores exceeding a predetermined threshold. Block 605 can be similar or identical to the activities described in connection with FIGS. 4 and 5.

In some embodiments, generating a labelled set of data can be based on using a blocking criteria. In several embodiments, retrieving records within a type of email to create a block and then sending out the block to a crowdsourcing system (e.g., Mechanical Turks). For example, the records within the email can be run using stringent rules on each blocking criteria until each of the records match up as part of a select a subgroup.

In various embodiments, depending on the quality of current data sources of a user, such a select subgroup can include a connected component for each user (e.g., customer) with approximately a 99% accuracy. In such an example, however, a key to identifying the truth of the identity of the connected components can be problematic as it depends on the quality of the candidate records used as part of an initial block. For example, the initial block size to use for $\sim O(n^2)$ comparisons can include a small size based on whether the initial block size is below a threshold size. However, for example some domain specific optimizations applied to the initial block can increase the initial block size exceeding the threshold size that can be used for $\sim O(n^2)$ comparisons. Further, there can be a risk of losing out on the coverage with regard to valid linkages for that user (e.g., customer), if the linkage is not included into the initial block.

In various embodiments, method 600 further can include a block 610 of generating an actual matching linkage set of the nodes linked in the connected components by using a relaxed blocking criteria.

In several embodiments, block 610 can include a block 615 of generating an initial labeled set using the relaxed blocking criteria.

In some embodiments, block 615 also can involve relaxing the blocking criteria. In several embodiments, during labelling, relaxing the blocking criteria can include adding one or more fields of a pair of records to a block of data (e.g., initial block of data) when any of the fields in the pair of records match more than one event and/or criteria. Such events and/or criteria can include an email, a phone number, variants of an address, a first name, a last name and/or another suitable attributes in case of events data). In various embodiments, after creating the block of data using the relaxed blocking criteria, the block of data can then be processed using the crowdsourcing system. In a number of embodiments, an advantage of using the relaxed blocking criteria over the blocking criteria can include: (i) ensuring signals and/or records which could potentially contribute to coverage are not lost and (ii) sending block samples to the crowdsourcing system for identification of the connected components linked to users. In various embodiments, another advantage to using the relaxing blocking criteria to generate a true labeled set is that the data can be used to calculate the quality score with high accuracy. In a number of embodiments, an end-to-end artificial intelligence application, such as Snorkel, also can be used to produce a high quality labelled dataset by providing a way to relax and tighten the acceptable threshold precision which affects the coverage of the valid linkages for a user.

In many embodiments, block 610 also can include a block 620 of transmitting the initial labeled set to a crowdsourcing platform to obtain a final labeled data set. In some embodiments, the actual matching linkage set can be based on the final labeled data set. In various embodiments, a final labeled data set can include positive label data points, where each positive label data point can represent a linkage existing between two identifiers.

In a number of embodiments, method 600 further can include a block 625 of generating a quality score for the connected components. In many embodiments, every connected component that represents a user can include a quality score. In general, while a retailer can desire have a single metric and corresponding value that fully describes a user identity quality, a single metric often lack a meaningful formulation due to the complexities of user touch points analyzed using different machine learning models and/or different algorithms.

Generally, a normal distribution can model real world phenomena, especially when the statistic is an attribute of a population. In some embodiments, a true user identity map can include a distribution of quality scores, where the x-axis represent scores or binned quality scores and y-axis represent a count of connected components to provide an understanding of the whole identity quality. In various embodiments, such a distribution of quality scores can take a distribution curve other than a normal distribution curve when the statistic is the quality score and the resulting distribution can be a function of noise (or rather lack of it) and the quality of our algorithms and/or pipeline data systems. In some embodiments, a normal distribution curve can be modeled based on the function of data and/or noise.

In various embodiments, a quality score can be similar to a conventional F1-score, but can be applied to a connected component. In several embodiments, modeling can be based on supervised models presently. In some embodiments, however, modeling also can be based on semi-supervised and/or unsupervised methods, to rescore quality scores per connected component. In many embodiments, the quality score can be defined and measured at the connected component level to determine the final artifact for identity of users.

In a number embodiments, the quality score for the connected components can be expressed as a ratio in equation 1, as follows:

$$QS=2PR/(P+R) \quad (1)$$

where, QS refers to a quality score, P refers to a precision metric and R refers to a recall metric.

In some embodiments, block 625 can include a block 630 of calculating a first ratio in which a numerator of the first ratio comprises a product of a precision metric of the connected components and a recall metric of the connected components. In several embodiments, a denominator of the first ratio can include a sum of the precision metric and the recall metric, where the recall metric measures a recall coverage of the nodes traceable to a user. For example, a precision metric often can include True positives/(True positives+False positives). In various embodiments, the precision metric of connected components can include (i) true positives that refer to linkages that were predicted to exist and that do exist, and (ii) false positives that refer to linkages that were predicted to exist but truly do not exist.

In a number embodiments, the precision metric can be expressed in equation 2, as follows:

$$\text{Precision} = (\text{A count of true matching linkages in a connected component within the predicted set})/(\text{A count of linkages predicted as matched in the connected component}) \quad (2)$$

In various embodiments, a recall metric can be based on a second ratio in which a numerator of the second ratio includes a count of actual matching linkages in the connected components. In several embodiments, a denominator of the second ratio can include a count of linkages predicted as matched in the connected component. In many embodiments, the recall metric can be based on a third ratio in which a numerator of the third ratio comprises the count of actual matching linkages in the connected components. In some embodiments, a denominator of the third ratio can include a count of all actual matching linkages that exist for the user. For example, a recall metric often can include True positives/(True positives+False negatives), where False negatives can refer to linkages that were predicted to not exist but that do exist. Further, the denominator in the recall metric based on a supervised setting can include a total number of positively labeled data points. In various embodiments, an estimate of the denominator can be generated based on historical domain data such as types of identifiers and/or types of linkages.

In a number embodiments, the recall metric can be expressed in equation 3, as follows:

$$\text{Recall} = \text{A count of true matching linkages in a connected component within the predicted set}/\text{A count of all true matching linkages which exist for that customer in the data} \quad (3)$$

In several embodiments, a denominator for a Recall can include a count of all true matching linkages which exist for that customer in the data. In some embodiments, estimating such a denominator metric can include false positives and/or false negative metrics. For example, theoretically, a tid and/or another suitable user identifier for each user can be present in each record of multiple records. For example, each record of multiple records can include approximately 25 billion linkages, events, and/or another suitable touchpoint tracked which can be practically impossible to produce a set of correctly labelled set of connected components using manual methods or by mental approaches using pen and paper even for one set of users.

In some embodiments, method 600 also can include a block 635 of generating a utility score independent of the quality score. In some embodiments, the utility score can measure a utility of a portion of the connected components corresponding to one or more use cases. Block 635 can be similar or identical to the activities described in FIG. 5.

In a number of embodiments, block 635 also can measure the utility of a connected component linked to a user and/or users, via the utility score, based on analyzing a portion of the connected components, such a portion can include two or more use cases. Such use cases can include targeting, personalization, analytics, audience building, privacy, and/or another suitable use case and/or use cases.

In various embodiments, while an improvement of a utility score can indirectly also improve the quality score, the reverse is not true. In some embodiments, discovering a true and/or accurate identity of a user can begin with identifying a user with a user identifier. In several embodiments, identifying a user linked to multiple nodes on a connected graph can be untarred and/or untainted by any single domain specific definition and/or interpretation. For example, identifying a user using identification logic focused on campaign targeting can include a goal of covering a large reach of customers more than a high precision on identifying a specific user. However, the same identification logic can be unusable for personalization where the goal includes precision of the identity of the specific users with a high degree of confidence in that data. In this example, the tradeoff for the two use cases, campaign targeting and personalization, depends on precision over coverage metrics.

In some embodiments, block 635 can use an intermediate formula that can be used directly to measure some aspect of identity of a user based on the following derivation, as follows:

Given a pair of types of nodes or types of identities A,B; how good is the quality between the two with regard to usability After calculating rho_{a_{i},b_{i}} for each user, calculate the mean (e.g., an intermediate mean) and a standard deviation of all the non zero rho_{a_{i},b_{i}}.

Based on the mean (e.g., the intermediate mean) and standard deviation, result can be: N' and \mu {\rho_{a, b}}. Further the overall utility score for a type of linkage between an identifier type A and a identifier type B can be calculated by finding a scaled average of the result.

In a number of embodiments, the utility score algorithm can be expressed in equation 4, as follows:

$$\rho_{a_i,b_i} = \max_{t_z \in T_{a_i,b_i}} \frac{1}{l_{t_z}} \sum_{j=0}^{l_{t_z}} q_j \quad (4)$$

$$\rho_{\rho a,b} = \frac{1}{N'} \sum_{i=0}^{N} \left( \rho_{a_i,b_i} \mid \rho_{a_i,b_i} \neq 0 \right) \; N' \in N \wedge \left( N' \exists \forall \rho_{a_i,b_i} \neq 0 \right)$$

$$U_{a,b} = \mu_{\rho_{a,b}} \frac{1}{N} \sum_{i=0}^{N} \left( \begin{cases} 1, & \text{if } |\mu_{\rho_{a,b}} - \rho_{a_i,b_i}| \leq \sigma_{\rho_{a,b}} \\ 0, & \text{otherwise} \end{cases} \right)$$

where:

a and b each refer to a type of identifier of multiple identifiers, where the multiple identifiers include classes of nodes rather than individual nodes. For example, individual type a nodes or type b nodes can include billions of each type of node, where each connected component also can include nonnegative numbers of nodes of type a and/or type b. For example, a type a node can refer to a computer identifier, and a type b can refer to an INID_____ identifier.

$T_{a_i b_i}$ refers to the set of all paths between nodes of type a and b for the ith customer, $t_z$ refers to a single path within the set $T_{a_i b_i}$, $\rho_{a_i b_i}$ refers to the mean linkage quality of the linkages that make up the path between two identifiers a, b for the ith customer, since there could be multiple nodes of type a and or b in each connected component, and since there could be multiple paths between nodes of type a and b, select the most optimal path when calculating $\rho_{a_i b_i}$, where, a most optimal can refer to the path that generates the highest mean linkage quality over that path, $l_{t_z}$ refers to the number of linkages which are in the path $t_z$, $q_j$ refers to the linkage score for the jth link of the path $t_z$, $\mu_{\rho_{a,b}}$ refers to the mean linkage quality of paths between identifier a and identifier b across all users, $\sigma_{\rho_{a,b}}$ refers to the standard deviation of linkage quality of paths between identifier a and identifier b across all users, $U_{a,b}$ refers to the overall utility of the pair of nodes a and b, N refers to the total number of users, N' refers to the total count of customers where the path a, b exists and the mean linkage quality of the optimal path is within 1 standard deviation of $\mu_{\rho_{a,b}}$.

For example, if a path does not exist for a connected component between identifier type a, and identifier type b, it is not considered in the overall mean calculation.

In various embodiments, block 635 can include a block 640 of generating the utility score by clustering the one or more nodes into clusters based on the one or more use cases. In some embodiments, the clusters can include a first cluster and a second cluster. Block 640 can be similar or identical to the activities described in connection with FIG. 4.

In several embodiments, block 635 also can include a block 645 of generating the utility score by identifying a linkage path across the clusters from a first node of the first cluster to a second node of the second cluster. Block 645 can be similar or identical to the activities described in connection with block 410 (FIG. 4), In various embodiments, identifying the linkage path block 645 also can include selecting a node from a cluster for the linkage path based on at least one of (i) a popularity of the node based on one of the one or more use cases (ii) a density of the node across the connected components, or (iii) a unique function of the node.

The techniques described above can provide a baseline for an identity system, and can incorporates provisions and aspects which have been learned over time and as the identity interweaves the aspects of customer data. Metrics can become ubiquitous primitives to objectively quantify identity quality instead of subjective perceptions. These metrics also can redefine how to think about customer mappings and data at a higher level of abstraction.

Turning back to the drawings to FIG. 3, quality measurement system 310 is merely exemplary and is not limited to the embodiments presented herein. Quality measurement system 310 can be employed in many different embodiments or examples not specifically depicted or described herein. In some embodiments, certain elements or systems of quality measurement system 310 can perform various procedures, processes, and/or acts. In other embodiments, the procedures, processes, and/or acts can be performed by other suitable elements or systems. In many embodiments, the systems of quality measurement system 310 can be modules of computing instructions (e.g., software modules) stored at non-transitory computer readable media. In other embodiments, the systems of quality measurement system 310 can be implemented in hardware.

In many embodiments, quality measurement system 310 can include a machine learning system 311. In a number of embodiments, machine learning system 311 can at least partially perform block 601 (FIG. 6) of generating linkage scores between nodes at least based on a machine learning model.

In several embodiments, quality measurement system 310 can include a creating system 312. In several embodiments, creating system 312 can at least partially perform block 605 (FIG. 6) of creating links between the nodes to form connected components based on the linkage scores exceeding a predetermined threshold, and/or block 630 (FIG. 6) of calculating a first ratio in which a numerator of the first ratio comprises a product of a precision metric of the connected components and a recall metric of the connected components In some embodiments, quality measurement system 310 can include a generating system 313. In various embodiments, generating system 313 can at least partially perform block 610 (FIG. 6) of generating an actual matching linkage set of the nodes linked in the connected components by using a relaxed blocking criteria, block 625 (FIG. 6) of generating a quality score for the connected components, and/or block 635 (FIG. 6) of generating a utility score independent of the quality score.

In various embodiments, quality measurement system 310 can include a selecting system 314. In several embodiments, selecting system 314 can at least partially perform block 615 (FIG. 6) of generating an initial labeled set using the relaxed blocking criteria.

In several embodiments, quality measurement system 310 can include a clustering system 315. In a number of embodiments, clustering system 315 can at least partially perform block 640 (FIG. 6) of generating the utility score by clustering the one or more nodes into clusters based on the one or more use cases.

In various embodiments, quality measurement system 310 can include an identifying system 316. In several embodiments, identifying system 316 can at least partially perform block 645 (FIG. 6) of identifying the linkage path across the clusters.

In some embodiments, quality measurement system 301 can include a communication system 317. In various embodiments, communication system 317 can at least partially perform block 620 (FIG. 6) of transmitting the initial labeled set to a crowdsourcing platform to obtain a final labeled data set.

In several embodiments, web server 320 can include webpage system 321. webpage system 321 can at least partially perform sending instructions to user computers (e.g., 350-351 (FIG. 3)) based on information received from communication system 317.

In many embodiments, the techniques described herein can be used continuously at a scale that cannot be handled using manual techniques. For example, the number of daily and/or monthly visits to the content source can exceed approximately ten million and/or other suitable numbers, the number of registered users to the content source can exceed approximately one million and/or other suitable numbers, and/or the number of products and/or items sold on the website can exceed approximately ten million (10,000,000) approximately each day and the number of linkages and identifiers of a user can exceed 25 billion (25,000,000,000,000).

In a number of embodiments, the techniques described herein can solve a technical problem that arises only within the realm of computer networks, as determining whether a quality score of a connected component contains a high level of accuracy to user and/or sell to clients based on various machine learning models, does not exist outside the realm of computer networks. Moreover, the techniques described herein can solve a technical problem that cannot be solved outside the context of computer networks. Specifically, the techniques described herein cannot be used outside the context of computer networks, in view of a lack of data, and because a content catalog, such as an online catalog, that can power and/or feed an online web site that is part of the techniques described herein would not exist.

Various embodiments can include a system including one or more processors and one or more non-transitory computer-readable media storing computing instructions configured to run on the one or more processors and perform certain acts. The acts can include generating linkage scores between nodes at least based on a machine learning model. The acts also can include creating links between the nodes to form connected components based on the linkage scores exceeding a predetermined threshold. The acts further can include generating an actual matching linkage set of the nodes linked in the connected components by using a relaxed blocking criteria. The acts additionally can include generating a quality score for the connected components.

A number of embodiments can include a method being implemented via execution of computing instructions configured to run at one or more processors and stored at one or more non-transitory computer-readable media. The method can include generating linkage scores between nodes at least based on a machine learning model. The method also can include creating links between the nodes to form connected components based on the linkage scores exceeding a predetermined threshold. The method further can include generating an actual matching linkage set of the nodes linked in the connected components by using a relaxed blocking criteria. The method additionally can include generating a quality score for the connected components, Although automatically generating quality measurements for graph connected components using machine learning models has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 5-6 may include different procedures, processes, and/or activities and be performed by many different modules, in many different orders, and/or one or more of the procedures, processes, or activities of FIGS. 5-6 may include one or more of the procedures, processes, or activities of another different one of FIGS. 5-6. As another example, the systems within quality measurement system 310, machine learning system 311, creating system 312, generating system 313, selecting system 314, clustering system 315, identifying system 316, and/or web server 320 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents

What is claimed is:

1. A system comprising:
one or more processors; and
one or more non-transitory computer-readable media storing computing instructions that, when executed on the one or more processors, cause the one or more processors to perform operations comprising:
generating linkage scores between nodes at least based on a machine learning model, wherein the machine learning model is trained using historical records of multiple types of the nodes over a period of time, and wherein the machine learning model is configured to output a linkage score based on a first degree of whether the nodes are matched by a common factor;
creating links between the nodes to form connected components based on the linkage scores exceeding a predetermined threshold;

generating an actual matching linkage set of the nodes linked in the connected components by using a relaxed blocking criteria;

generating, by using the relaxed blocking criteria, an initial labeled set, wherein the relaxed blocking criteria is configured to prevent loss of data signals and configured to be tuned by relaxing and tightening a precision threshold associated with the connected components;

updating the initial labeled set by adding one or more fields of a pair of records to the initial labeled set when at least one of the one or more fields in the pair of records match more than one event; and generating a quality score for the connected components, wherein the quality score comprises an objective metric configured to measure a quality of tracking different events of each user to identify a true graph of each user stored in a database.

2. The system of claim 1, wherein:

generating the linkage scores comprises at least one of profile matching, or co-occurrence matching;

generating the linkage scores further comprises determining the linkage score for each pair of nodes of a group of the nodes based upon a distance between each node of each pair of nodes; and determining the linkage scores further comprises:
calculating, using a machine learning classification model, a respective distance between each node of the group of the nodes based on a second degree of whether each node of the group of the nodes is linked to at least an event identifier or a user identifier;

calculating, using an entity matching algorithm, a score representing similarities between two data points;

training the machine learning classification model using training data uses attributes of two identifiers as input data and outputs a score between 0 and 1 to represent a degree of similarity between the two identifiers, wherein a score of 1 indicates a match and a score of 0 indicates no match;

determining whether a pair of nodes exceed a predetermined linkage threshold; and when the pair of nodes exceeds the predetermined linkage threshold, forming a criteria for at least one of:
linking the pair of nodes;
determining a distance of each linkage between the pair of nodes, where a shorter distance of a longer distance of each link can indicate a respective probability that the pair of nodes are related by at least the event or the user identifier; or
grouping the pair of nodes into a larger connected component group based on a cluster of components on a graph.

3. The system of claim 1, wherein each of the nodes comprises (i) a respective type of identifier of multiple identifiers and (ii) a respective traceable entity identifier.

4. The system of claim 1, wherein generating the quality score comprises:
calculating a first ratio in which a numerator of the first ratio comprises a product of a precision metric of the connected components and a recall metric of the connected components, and in which a denominator of the first ratio comprises a sum of the precision metric and the recall metric, wherein the recall metric measures a recall coverage of the nodes traceable to a user.

5. The system of claim 4, wherein:
the precision metric is based on a second ratio in which a numerator of the second ratio comprises a count of actual matching linkages in the connected components and in which a denominator of the second ratio comprises a count of linkages predicted as matched in the connected components; and the recall metric is based on a third ratio in which a numerator of the third ratio comprises the count of actual matching linkages in the connected components and in which a denominator of the third ratio comprises a count of all actual matching linkages that exist for the user.

6. The system of claim 1, wherein generating the actual matching linkage set of the nodes comprises:
transmitting the initial labeled set to a crowdsourcing platform to obtain a final labeled data set, wherein the actual matching linkage set is based on the final labeled data set.

7. The system of claim 1, wherein the computing instructions, when executed on the one or more processors, further cause the one or more processors to perform an operation comprising:
generating a utility score independent of the quality score, wherein the utility score measures a utility of a portion of the connected components corresponding to one or more use cases.

8. The system of claim 7, wherein generating the utility score comprises:
clustering one or more nodes into clusters based on the one or more use cases, wherein the clusters comprise a first cluster and a second cluster.

9. The system of claim 8, wherein generating the utility score comprises:
identifying a linkage path across the clusters from a first node of the first cluster to a second node of the second cluster.

10. The system of claim 9, wherein identifying the linkage path further comprises:
selecting a node from a cluster of the clusters for the linkage path based on at least one of:
a popularity of the node based on one of the one or more use cases;
a density of the node across the connected components; or
a unique function of the node.

11. A method being implemented via execution of computing instructions configured to run on one or more processors and stored at one or more non-transitory computer-readable media, the method comprising:
generating linkage scores between nodes at least based on a machine learning model, wherein the machine learning model is trained using historical records of multiple types of the nodes over a period of time, and wherein the machine learning model is configured to output a linkage score based on a first degree of whether the nodes are matched by a common factor;

creating links between the nodes to form connected components based on the linkage scores exceeding a predetermined threshold;

generating an actual matching linkage set of the nodes linked in the connected components by using a relaxed blocking criteria;

generating, by using the relaxed blocking criteria, an initial labeled set, wherein the relaxed blocking criteria is configured to prevent loss of data signals and configured to be tuned by relaxing and tightening a precision threshold associated with the connected components;

updating the initial labeled set by adding one or more fields of a pair of records to the initial labeled set when at least one of the one or more fields in the pair of records match more than one event; and generating a quality score for the connected components, wherein the quality score comprises an objective metric configured to measure a quality of tracking different events of each user to identify a true graph of each user stored in a database.

12. The method of claim 11, wherein:

generating the linkage scores comprises at least one of profile matching or co-occurrence matching;

generating the linkage scores further comprises determining the linkage score for each pair of nodes of a group of the nodes based upon a distance between each node of each pair of nodes; and determining the linkage scores further comprises:

calculating, using a machine learning classification model, a respective distance between each node of the group of the nodes based on a second degree of whether each node of the group of the nodes is linked to at least an event identifier or a user identifier;

calculating, using an entity matching algorithm, a score representing similarities between two data points;

training the machine learning classification model using training data uses attributes of two identifiers as input data and outputs a score between 0 and 1 to represent a degree of similarity between the two identifiers, wherein a score of 1 indicates a match and a score of 0 indicates no match;

determining whether a pair of nodes exceed a predetermined linkage threshold; and when the pair of nodes exceeds the predetermined linkage threshold, forming a criteria for at least one of:

linking the pair of nodes;

determining a distance of each linkage between the pair of nodes, where a shorter distance of a longer distance of each link can indicate a respective probability that the pair of nodes are related by at least the event or the user identifier; or grouping the pair of nodes into a larger connected component group based on a cluster of components on a graph.

13. The method of claim 11, wherein each of the nodes comprises (i) a respective type of identifier of multiple identifiers and (ii) a respective traceable entity identifier.

14. The method of claim 11, wherein generating the quality score comprises:

calculating a first ratio in which a numerator of the first ratio comprises a product of a precision metric of the connected components and a recall metric of the connected components, and in which a denominator of the first ratio comprises a sum of the precision metric and the recall metric, wherein the recall metric measures a recall coverage of the nodes traceable to a user.

15. The method of claim 14, wherein:

the precision metric is based on a second ratio in which a numerator of the second ratio comprises a count of actual matching linkages in the connected components and in which a denominator of the second ratio comprises a count of linkages predicted as matched in the connected components; and the recall metric is based on a third ratio in which a numerator of the third ratio comprises the count of actual matching linkages in the connected components and in which a denominator of the third ratio comprises a count of all actual matching linkages that exist for the user.

16. The method of claim 11, wherein generating the actual matching linkage set of the nodes comprises:

transmitting the initial labeled set to a crowdsourcing platform to obtain a final labeled data set, wherein the actual matching linkage set is based on the final labeled data set.

17. The method of claim 11, further comprises:

generating a utility score independent of the quality score, wherein the utility score measures a utility of a portion of the connected components corresponding to one or more use cases.

18. The method of claim 17, wherein generating the utility score comprises:

clustering one or more nodes into clusters based on the one or more use cases, wherein the clusters comprise a first cluster and a second cluster.

19. The method of claim 18, wherein generating the utility score comprises:

identifying a linkage path across the clusters from a first node of the first cluster to a second node of the second cluster.

20. The method of claim 19, wherein identifying the linkage path further comprises:

selecting a node from a cluster of the clusters for the linkage path based on at least one of:

a popularity of the node based on one of the one or more use cases;

a density of the node across the connected components; or a unique function of the node.

* * * * *